(12) United States Patent
Liu

(10) Patent No.: US 12,526,100 B2
(45) Date of Patent: Jan. 13, 2026

(54) INFORMATION NOTIFICATION METHOD, INFORMATION RECEIVING METHOD, APPARATUS AND DEVICE, AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 428 days.

(21) Appl. No.: 18/026,118

(22) PCT Filed: Sep. 16, 2020

(86) PCT No.: PCT/CN2020/115705
§ 371 (c)(1),
(2) Date: Mar. 13, 2023

(87) PCT Pub. No.: WO2022/056749
PCT Pub. Date: Mar. 24, 2022

(65) Prior Publication Data
US 2023/0336297 A1 Oct. 19, 2023

(51) Int. Cl.
*H04L 5/00* (2006.01)
*H04W 68/00* (2009.01)

(52) U.S. Cl.
CPC ......... *H04L 5/0048* (2013.01); *H04W 68/005* (2013.01)

(58) Field of Classification Search
None
See application file for complete search history.

(56) References Cited

U.S. PATENT DOCUMENTS

2015/0318972 A1  11/2015  Zhang et al.
2019/0115955 A1*  4/2019  John Wilson ......... H04L 5/0055
2020/0229161 A1  7/2020  Raghavan et al.

FOREIGN PATENT DOCUMENTS

| CN | 102420644 A | 4/2012 |
| CN | 102447524 A | 5/2012 |
| CN | 105812034 A | 7/2016 |
| CN | 110072285 A | 7/2019 |
| CN | 111201741 A | 5/2020 |
| CN | 111464275 A | 7/2020 |
| WO | 2017107067 A1 | 6/2017 |

(Continued)

OTHER PUBLICATIONS

International Search Report of PCT/CN2020/115705 dated Apr. 25, 2021, with English translation, (4p).

(Continued)

*Primary Examiner* — Gary Lafontant
(74) *Attorney, Agent, or Firm* — Arch & Lake LLP

(57) ABSTRACT

An information notification method is applied to a network device, and includes: sending notification information to a first terminal, the notification information being used to notify at least one of a sending state change and a sending state of a reference signal corresponding to a target port. The first terminal is in an idle state or an inactive state, the first terminal shares the reference signal of a second terminal, and the second terminal is at least one terminal in a connected state.

20 Claims, 5 Drawing Sheets

(56) References Cited

FOREIGN PATENT DOCUMENTS

| | | |
|---|---|---|
| WO | 2018202023 A1 | 11/2018 |
| WO | 2020143724 A1 | 7/2020 |

OTHER PUBLICATIONS

The First CNOA issued in Application No. 202080002375.5 dated Oct. 14, 2022, with English translation, (23p).
Moderator (Samsung), "Summary for TRS/CSI-RS occasion(s) for idle/inactive UEs", 3GPP TSG RAN WG1 #102-e e-Meeting, R1-200xxxx, Aug. 17-28, 2020, (24p).
Ericsson. "Provisioning of potential TRS/CSI-RS occasion(s) for Idle/Inactive UEs", 3GPP TSG RAN WG1 #102-e Tdoc, R1-2006666, e-Meeting, Aug. 17-Aug. 28, 2020, (5p).
Notice of Allowance issued to Chinese Application No. 202080002375.5 dated Apr. 18, 2023 with English translation, (3p).
Pingbao, Lyu et al., New RRC Status in 5G and its Application in Mobility Management dated May 10, 2017, Published by Telecommunications Information, (5p).

\* cited by examiner

INFORMATION NOTIFICATION METHOD, INFORMATION RECEIVING METHOD, APPARATUS AND DEVICE, AND STORAGE MEDIUM

CROSS REFERENCE TO RELATED APPLICATION

The present disclosure is the U.S. national phase application of International Application No. PCT/CN2020/115705 filed on Sep. 16, 2020, the content of which is incorporated herein by reference in its entirety for all purposes.

TECHNICAL FIELD

The present disclosure relates to the field of communication technology, in particular to an information notification method, an information receiving method, an apparatus, a device and a storage medium.

BACKGROUND

Different types of reference signals, which are used for realizing different functions, are defined in the communication specification.

In the related art, the reference signal is configured by a network device to a terminal in the connected state.

SUMMARY

The present disclosure provides an information notification method, an information receiving method, an apparatus, a device and a storage medium.

According to a first aspect of the present disclosure, an information notification method is provided, which is applied to a network device. The method includes: sending notification information to a first terminal, where the notification information may be configured to notify at least one of a sending state change or a sending state of a reference signal corresponding to a target port. Furthermore, the first terminal is in an idle or an inactive state, the first terminal shares the reference signal of a second terminal, and the second terminal is at least one terminal in a connected state.

According to a second aspect of the present disclosure, an information receiving method is provided, which is applied to a first terminal in an idle or an inactive state. The first terminal shares a reference signal of a second terminal, and the second terminal is at least one terminal in a connected state. The method includes: receiving notification information, where the notification information is configured to notify at least one of a sending state change or a sending state of the reference signal corresponding to a target port.

According to a third aspect of the present disclosure, a first terminal is provided. The first terminal includes: a processor; a transceiver connected with the processor; a memory for storing instructions executable by the processor; wherein the processor is configured to load and execute the instructions to implement the information receiving method as described in the second aspect above.

According to a fourth aspect of the present disclosure, a network device is provided. The network device includes: a processor; a transceiver connected with the processor; a memory for storing instructions executable by the processor; wherein the processor is configured to load and execute the instructions to implement the information notification method as described in the first aspect above.

According to a fifth aspect of the present disclosure, a chip is provided, which includes a programmable logic circuit and/or program instructions, and when running, cause the information notification method or the information receiving method described above to be implemented.

According to a sixth aspect of the present disclosure, a computer-readable storage medium is provided, in which executable instructions are stored, and when the executable instructions are loaded and executed by a processor, the information notification method or the information receiving method described above is caused to be implemented.

According to a seventh aspect of the present disclosure, a computer program is provided. The computer program includes computer instructions, and the computer instructions are stored in a computer-readable storage medium. A processor of a computer device reads the computer instructions from the computer-readable storage medium, and the processor executes the computer instructions, causing the computer device to execute the information receiving method or the information notification method provided in the above aspects.

BRIEF DESCRIPTION OF THE DRAWINGS

In order to explain technical solutions in embodiments of the present disclosure more clearly, drawings required in description of the embodiments will be briefly introduced in the following. It is apparent that the drawings in the following description are only some embodiments of the present disclosure, and other drawings can also be obtained from these drawings by those skilled in the art without any creative efforts.

DETAILED DESCRIPTION

Figure 1:
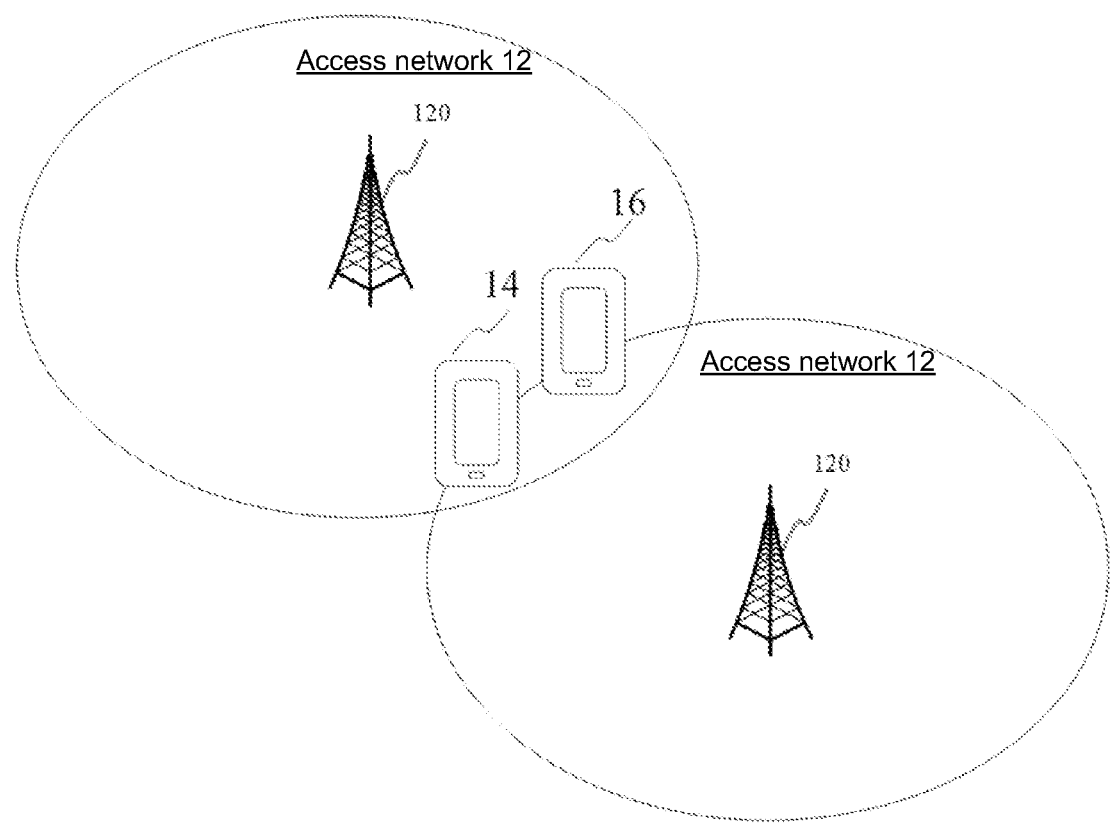
FIG. 1 is a block diagram of a communication system provided by exemplary embodiments of the present disclosure.

In order to make the purpose, solutions and advantages of the present disclosure clearer, embodiments of the present disclosure will be further described in detail in combination with the drawings.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure as recited in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

For making it convenient for those skilled in the art to understand, multiple implementation modes are listed in the embodiments of the disclosure to describe the technical solutions of the embodiments of the disclosure clearly. Of course, those skilled in the art can understood that multiple embodiments provided in the embodiments of the disclosure can be executed independently, or can be combined with methods of the other embodiments in the embodiments of the disclosure for execution together, or may be executed independently or after combined with some methods in other related technologies. No limits are made thereto in the embodiments of the disclosure.

Before the information receiving method and notification method provided by embodiments of the present disclosure are described in detail, a brief introduction of terms and an application environment involved in embodiments of the present disclosure will be given first.

1. Radio Resource Control (RRC) State

A terminal in a communication system can be in any of three RRC states, which will be briefly introduced in the following.

RRC_IDLE state (i.e., an idle state): mobility includes terminal based cell selection/reselection. Paging is initiated by the Core Network (CN), and a paging area is configured by the CN. No UE access context exists on a network device side, and no RRC connection exists.

RRC_CONNECTED state (i.e., a connected state): there exists an RRC connection, and there exists UE access context on the network device and the terminal. The network device side knows a location of the terminal at a specific cell level. Mobility is the mobility controlled by the network device side. Unicast data can be transmitted between the terminal and the network device.

RRC_INACTIVE state (i.e., an inactive state): a new RRC state defined in the 5G network environment, for the purpose of reducing signaling over an air interface, quickly recovering radio connections and data services. Mobility includes terminal based cell selection/reselection. There exists a connection between CN-NR, and there exists UE access context on a network device. The paging is triggered by the Radio Access Network (RAN). An RAN-based paging area is managed by the RAN. The network device side knows a location of the terminal at an RAN-based paging area level.

A first terminal according to embodiments of the present disclosure is a terminal in the idle or inactive state.

The behavior of the first terminal in idle or inactive state may include two cases:

1) In the case of good channel quality in the cell, the first terminal only needs to wake up ahead of a Synchronization Signal Block (SSB) nearest to a Paging Occasion (PO), perform time calibration through synchronization signals (such as a main synchronization signal and an auxiliary synchronization signal) of one SSB, and then receive the paging.

2) In the case of poor channel quality in the cell, the first terminal may need to synchronize through multiple SSBs. The first terminal needs to wake up ahead of the multiple SSBs, perform time calibration through synchronization signals (such as main synchronization signals and auxiliary synchronization signals) of the multiple SSBs, and then receive the paging, resulting in higher power consumption.

In addition, in the case of poor channel quality in the cell, a mechanism, where PO is repeatedly sent, may be introduced, especially for terminals with enhanced characteristics, such as Reduced Capabilities (RedCap) terminals. Also, when the channel quality in the cell is poor, the signal measurement is required to be performed in the cell. The strength of the Reference Signal Received Power (RSRP) of the SSB of the cell is measured a certain number of times in a certain time.

It can be seen from above introduction to the behavior of the first terminal that, in the case of poor channel quality in the cell, the first terminal has a high power consumption and needs to be optimized largely.

2. Reference Signal

There are many reference signals in the communication system, which can also be called as pilots. These reference signals have their own functions.

The reference signals involved in embodiments of the present disclosure have functions such as time-frequency synchronization, automatic gain control (AGC) adjustment, etc. The reference signals include but are not limited to Channel State Information Reference Signal (CSI-RS) and Tracking Reference Signal (TRS).

CSI-RS is a channel state reference signal introduced earlier in the communication specification, which can be used for channel demodulation. TRS is a special reference signal for timing tracking introduced in New Radio (NR).

3. Antenna Port

An antenna port is defined as when an orthogonal frequency division multiplexing (OFDM) symbol is transmitted through an antenna port, a channel it experiences is the same as that of other OFDM symbols transmitted on the antenna port. Alternatively, the terminal believes that whether two transmitted signals experience the same wireless channel depends on whether the two signals are transmitted through the same antenna port.

The antenna port is a logical concept and does not correspond to a specific physical antenna.

For example, two different groups of signals are sent through multiple physical antennas in the same way. From the perspective of a receiver of the terminal, these two groups of signals are transmitted through the same equivalent channel. The two groups of signals actually experience a channel generated by a "sum" of multiple antenna channels, which can be regarded as two groups of signals sent by one single antenna port.

For example, two groups of signals are sent through the same multiple physical antennas, but in different precoding methods (precoding at a transmitter is not known to the terminal). From the perspective of a receiver of the terminal, these two groups of signals actually experience different channels, because all precoding at the transmitter that is not known to the terminal can be regarded as a part of the whole wireless channel. That is, the two groups of signals are sent from different antenna ports. It should be noted that if the precoding at the transmitter is known to the terminal, these two groups of signals again can be regarded as being sent from the same antenna port.

4. Paging

In the communication system, when needing to page a terminal, the network device can send paging Downlink Control Information (paging DCI) over the Physical Downlink Control Channel (PDCCH). After detecting the paging DCI in the PDCCH channel, the terminal can detect a paging message in the Physical Downlink Shared Channel (PDSCH). If the paging message includes a UE identity (ID) of the terminal, UE determines that it is itself being paged. If the paging message does not include the UE ID of the terminal, UE determines that it is not itself being paged.

FIG. 1 is a block diagram of a communication system provided by exemplary embodiments of the present disclosure. The communication system may include an access network 12, a first terminal 14 and a second terminal 16.

The access network 12 includes several network devices 120. The network device 120 can be a base station, which is a device deployed in the access network to provide wireless communication functions for the terminal. The base station can include various forms of macro base stations, micro base stations, relay stations, and access points, etc. In systems using different wireless access technologies, names of devices having base station functions may be different. For example, in the LTE system, such device is called as eNodeB or eNB. In the 5G NR-U system, such device is called as gNodeB or gNB. With the evolution of the communication technology, description of the "base station" may change. For convenience, in embodiments of the present disclosure, devices providing wireless communication functions for the first terminal 14 (or the second terminal 16) are collectively called as network devices.

The first terminal 14 and the second terminal 16 can include various handheld devices, vehicle-mounted devices, wearable devices, computing devices having wireless communication functions, or other processing devices connected to wireless modems, as well as various forms of user devices, mobile stations (MS), terminal devices, and so on. For convenience of description, the devices mentioned above are collectively called as terminals. The network device 120 and the first terminal 14 (or the second terminal 16) communicate with each other through some air interface technology, such as the Uu interface.

The second terminal 16 is in the connected state, and the first terminal 14 is in the idle or inactive state. The second terminal 16 is at least one terminal in the connected state, and the network device 120 configures the reference signal to the second terminal 16 in the connected state for use. In embodiments of the present disclosure, the first terminal 14 in the idle or inactive state can also share the reference signal.

Technical solutions of embodiments of the present disclosure can be applied to various communication systems, for example, the Global System of Mobile Communication (GSM) system, the Code Division Multiple Access (CDMA) system, the Wideband Code Division Multiple Access (WCDMA) system, the General Packet Radio Service (GPRS) system, the Long Term Evolution (LTE) system, the LTE Frequency Division Duplex (FDD) system, the LTE Time Division Duplex (TDD) system, the Advanced Long Term Evolution (LTE-A) system, the New Radio (NR) system, the evolution system of the NR system, the LTE-based access to Unlicensed spectrum (LTE-U) system, the Universal Mobile Telecommunication System (UMTS), the Worldwide Interoperability for Microwave Access (WiMAX) communication system, Wireless Local Area Networks (WLAN), Wireless Fidelity (WiFi), next generation communication system or other communication systems.

Generally speaking, number of connections supported by traditional communication systems is limited and easy to implement. However, with the development of communication technology, mobile communication systems will not only support traditional communication, but also support, for example, Device-to-Device (D2D) communication, Machine-to-Machine (M2M) communication, Machine Type Communication (MTC), Vehicle to Vehicle (V2V) communication and Vehicle to Everything (V2X) systems. Embodiments of the present disclosure can also be applied to these communication systems.

Figure 2:
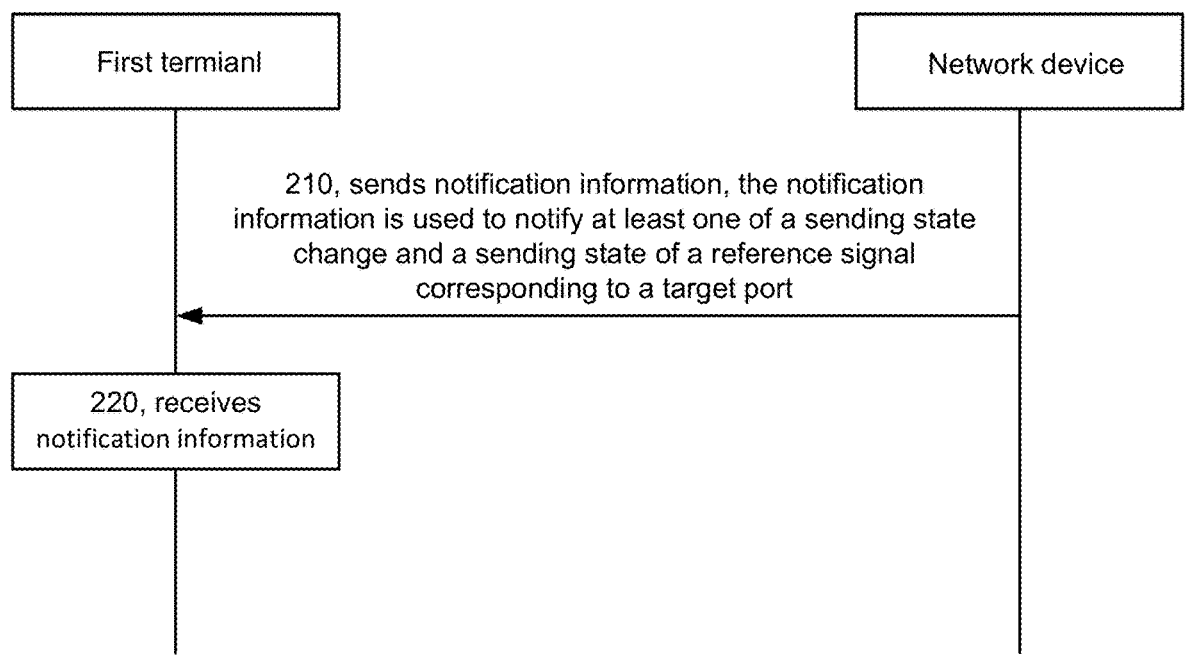
FIG. 2 is a flowchart of an information receiving method provided by exemplary embodiments of the present disclosure.

FIG. 2 is a flowchart of an information receiving method provided by exemplary embodiments of the present disclosure. The method can be applied to the first terminal and the network device shown in FIG. 1, where the first terminal is in an idle or an inactive state, and the method includes following steps.

Step 210, a network device sends notification information. Herein, the notification information is used to notify at least one of a sending state change and a sending state of a reference signal corresponding to a target port.

In some embodiments, a reference signal is a physical signal having certain functions in the communication system. The reference signal involved in embodiments of the present disclosure has functions such as time-frequency synchronization, AGC adjustment, etc. Generally, the reference signal can be divided into an uplink reference signal and a downlink reference signal. The uplink reference signal refers to a reference signal sent by the first terminal to the network device, and the downlink reference signal refers to a reference signal sent by the network device to the first terminal. The reference signal in embodiments of the present disclosure is the downlink reference signal.

The reference signal is generally configured to the terminal in the connected state. In embodiments of the present disclosure, the second terminal is at least one terminal in the connected state, and the first terminal in the idle or inactive state can use the reference signal by sharing the reference signal of the second terminal.

There are different antenna ports in the communication system. The antenna port is used to distinguish channel characteristics. Signals sent through the same antenna port can be considered to have experienced the same wireless channel. The network device sends the reference signal through the antenna port, and the first terminal receives the reference signal through the same antenna port. In the communication system, the network device has a certain degree of flexibility, and the network device can change the sending state of the reference signal corresponding to the antenna port thereof. For example, the network device may stop sending a reference signal corresponding to an antenna port after having sent the reference signal corresponding to the antenna port for a period of time. The network device may also restart sending the reference signal corresponding to an antenna port after having stopped sending the reference signal.

In embodiments of the present disclosure, the notification information is used to notify at least one of the sending state change and the sending state of the reference signal corresponding to a target port.

In some embodiments, the notification information is used to notify the sending state change of the reference signal corresponding to a target port. The sending state change refers to the change of next sending state of the reference signal corresponding to the target port relative to previous sending state of the reference signal corresponding to the target port. In the case where the notification information is used to notify the sending state change, the first terminal needs to determine next sending state of the reference signal corresponding to the target port based on previous sending state of the reference signal corresponding to the target port. The sending state may include that the network device sends the reference signal corresponding to the target port, or that the network device does not send the reference signal corresponding to the target port. For example, when the previous sending state of the reference signal corresponding to the target port is that the network device sends the reference signal corresponding to the target port, the first terminal can determine after receiving the notification information that the next sending state of the reference signal corresponding to the target port is that the network device does not send the reference signal corresponding to the target port. For example, when the previous sending state of the reference signal corresponding to the target port is that the network device does not send the reference signal corresponding to the target port, the first terminal can determine after receiving the notification information that the next sending state of the reference signal corresponding to the target port is that the network device sends the reference signal corresponding to the target port.

In some embodiments, the notification information is used to notify the sending state of the reference signal corresponding to a target port. The sending state may include that the network device sends the reference signal corresponding to the target port, or that the network device does not send the reference signal corresponding to the target port.

In some embodiments, the notification information is used to notify the sending state change and the sending state of the reference signal corresponding to a target port. The target ports can include a first part of ports and a second part of ports. The second part of ports are other antenna ports in the target ports except the first part of ports. The notification information is used to notify the sending state change of the reference signal corresponding to the first part of ports and used to notify the sending state of the reference signal corresponding to the second part of ports. For example, the target port include antenna port 1, antenna port 2 and antenna port 3. The notification information is used to notify the sending state change of the reference signal corresponding to antenna port 1, and also used to notify the sending states of the reference signals corresponding to antenna port 2 and antenna port 3.

Step 220, a first terminal receives the notification information.

The network device sends the notification information to the first terminal, and the first terminal receives the notification information accordingly, so as to know the change in whether the reference signal corresponding to the target port is sent or not.

According to the method provided by embodiments of the present disclosure, the first terminal in the idle or inactive state shares the reference signal of the second terminal in the connected state. The network device sends the notification information, which is used to notify at least one of the sending state change and the sending state of the reference signal corresponding to a target port, and the first terminal accordingly knows by receiving the notification information that whether the reference signal corresponding to the target port is sent, so that the accuracy of information interaction in the communication system can be improved.

Figure 3:
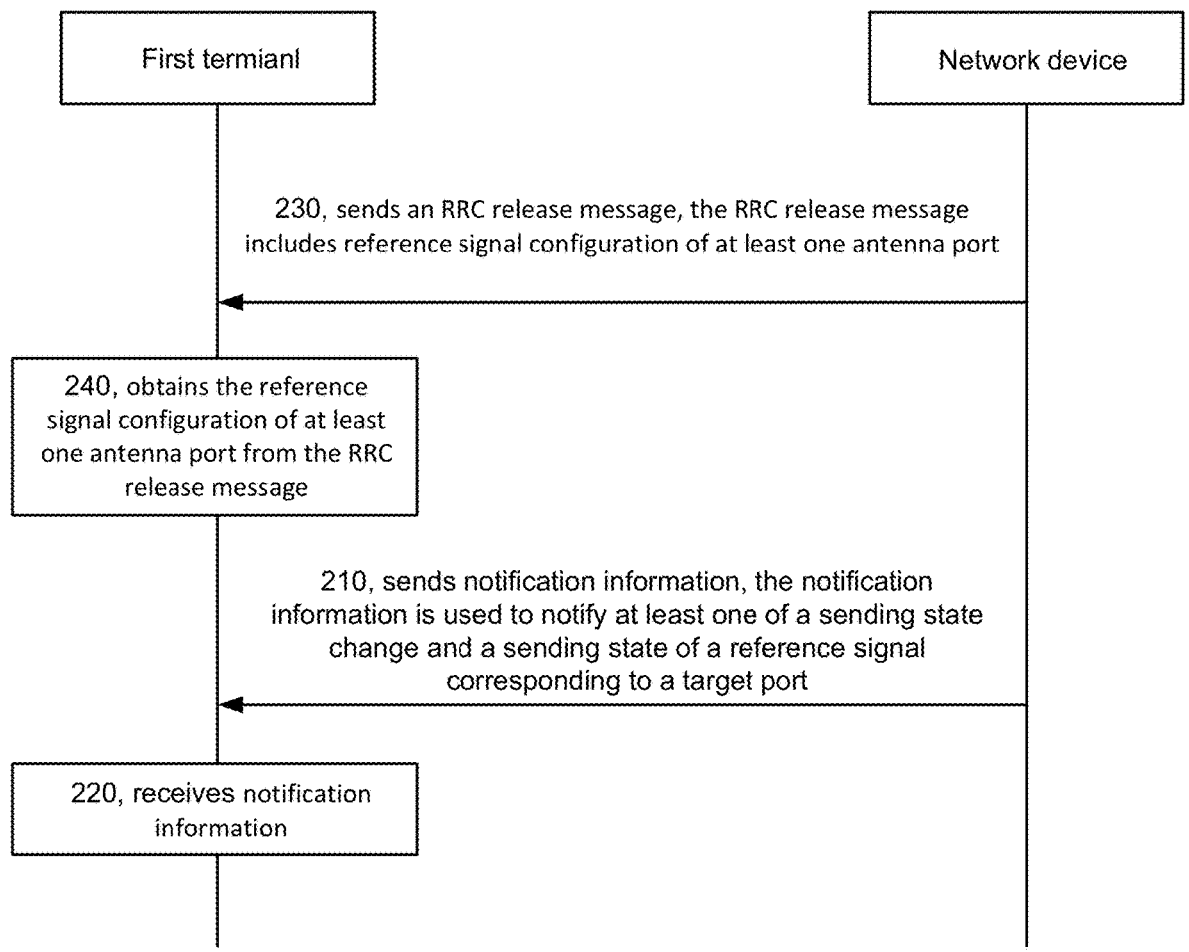
FIG. 3 is a flowchart of an information receiving method provided by exemplary embodiments of the present disclosure.

In some embodiments based on FIG. 2, a flowchart of an information receiving method provided by exemplary embodiments of the present disclosure is shown in FIG. 3. The method can be applied to the first terminal and the network device shown in FIG. 1. In some embodiments, step 230 and step 240 are further included in the method.

Step 230, a network device sends an RRC release message to a first terminal. Herein, the RRC release message includes reference signal configuration of at least one antenna port.

The RRC release message is used to notify the first terminal to release an RRC connection and corresponding radio resources. In some embodiments, after receiving the RRC release message, the first terminal releases the RRC connection and corresponding radio resources, executes the procedure of leaving the connected state, and finally enters the idle or inactive state.

It can be understood that the first terminal is in the connected state before receiving the RRC release message. After receiving the RRC release message and obtaining the reference signal configuration of at least one antenna port from the RRC release message, the first terminal is in the idle or inactive state.

The network device provides the reference signal configuration corresponding to the first terminal through the RRC release message. The reference signal configuration is used to configure a frequency domain width, a frequency domain density, and a period of a reference signal resource, and so on. The reference signal configuration in the RRC release message corresponds to at least one antenna port.

In some embodiments, the reference signal configuration of at least one antenna port includes the reference signal configuration of one antenna port, or reference signal configurations of multiple antenna port. For example, the RRC release message includes the reference signal configuration of antenna port 1, that is, the first terminal holds the reference signal configuration of only one antenna port. For example, the RRC release message includes the reference signal configurations of antenna port 1 and antenna port 2, that is, the first terminal holds the reference signal configurations of multiple antenna ports.

Step 240, the first terminal obtains the reference signal configuration of at least one antenna port from the RRC release message.

The first terminal determines the antenna port for subsequent receiving of the reference signal according to the reference signal configuration of at least one antenna port obtained from the RRC release message.

In some embodiments, in addition to obtaining the reference signal configuration of at least one antenna port, the first terminal will also obtain SSB configuration of the at least one antenna port. The first terminal will receive SSB from corresponding antenna port according to the SSB configuration of the at least one antenna port.

Step 210, the network device sends notification information, which is used to notify at least one of a sending state change and a sending state of a reference signal corresponding to a target port.

The target port notified in the notification message is an antenna port in the at least one antenna port corresponding to the reference signal configuration in the RRC release message. For example, the at least one antenna port corresponding to the reference signal configuration includes antenna port 1 and antenna port 2. The target port is at least one antenna port in antenna port 1 and antenna port 2.

Step 220, the first terminal receives the notification information.

The network device sends the notification information to the first terminal, and the first terminal receives the notification information accordingly, so as to know the change in whether the reference signal corresponding to the target port is sent or not.

According to the method provided by embodiments of the present disclosure, the first terminal in the idle or inactive state shares the reference signal of the second terminal in the connected state. The network device sends the notification information, which is used to notify at least one of the sending state change and the sending state of the reference signal corresponding to a target port, and the first terminal accordingly knows by receiving the notification information that whether the reference signal corresponding to the target port is sent, so that the accuracy of information interaction in the communication system can be improved.

According to the method provided by embodiments of the present disclosure, the network device provides the reference signal configuration corresponding to the first terminal through the RRC release message. The reference signal configuration in the RRC release message corresponds to at least one antenna port, so that the first terminal can determine whether the reference signal corresponds to multiple antenna ports.

In some embodiments based on FIG. 2, the sending state change of the reference signal corresponding to the target port includes stopping sending of the reference signal corresponding to at least one antenna port in the target port. Alternatively, the sending state change of the reference signal corresponding to the target port includes restarting sending of the reference signal corresponding to at least one antenna port in the target port.

That is, the sending state change of the reference signal corresponding to an antenna port can be stopping sending of the reference signal corresponding to the antenna port, or restarting sending of the reference signal corresponding to the antenna port.

In the case where the target port is one antenna port, the notification information can notify the sending state change of the reference signal corresponding to the one antenna port, for example, stopping sending of the reference signal corresponding to the antenna port, or restarting sending of the reference signal corresponding to the antenna port.

In the case where the target port is multiple antenna ports, the notification information can notify the sending state changes of the reference signals corresponding to multiple antenna ports. For example, the target port includes antenna port 1 and antenna port 2. The notification information may include stopping sending of reference signals corresponding to antenna port 1 and antenna port 2, or restarting sending of reference signals corresponding to antenna port 1 and antenna port 2, or stopping sending of the reference signal corresponding to antenna port 1 and restarting sending of the reference signal corresponding to antenna port 2, or stopping sending of the reference signal corresponding to antenna port 2 and restarting sending of the reference signal corresponding to antenna port 1.

Figure 4:
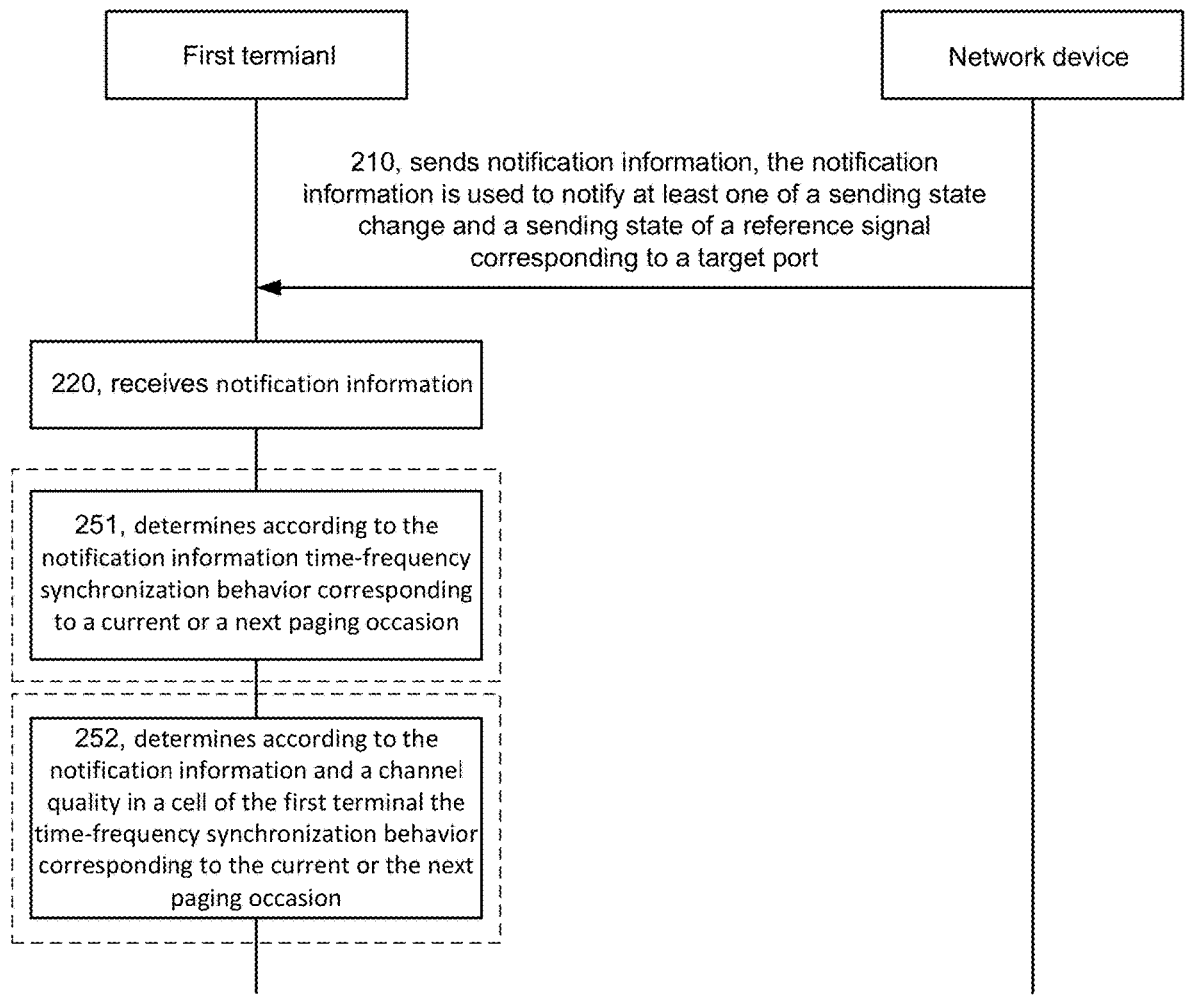
FIG. 4 is a flowchart of an information receiving method provided by exemplary embodiments of the present disclosure.

In some embodiments based on FIG. 2, a flowchart of an information receiving method provided by exemplary embodiments of the present disclosure is shown in FIG. 4. The method can be applied to the first terminal and the network device shown in FIG. 1. In some embodiments, step 251 or step 252 is further included in the method.

Step 210, a network device sends notification information. Herein, the notification information is used to notify at least one of a sending state change and a sending state of a reference signal corresponding to a target port.

In some embodiments, the notification information is used to notify the sending state change of the reference signal corresponding to a target port. In some embodiments, the notification information is used to notify the sending state of the reference signal corresponding to the target port. In some embodiments, the notification information is used to notify the sending state change and the sending state of the reference signal corresponding to the target port.

Step 220, a first terminal receives the notification information.

The first terminal receives the notification information sent by the network device.

Step 251, the first terminal determines according to the notification information time-frequency synchronization behavior corresponding to a current or a next paging occasion.

The first terminal determines the time-frequency synchronization behavior in current paging occasion or before next paging occasion, according to the content of the notification information. The time-frequency synchronization behavior includes at least one of time synchronization behavior and frequency synchronization behavior.

The paging occasion is a time period for the first terminal to detect whether there is a paging message.

In order to monitor the paging occasion, the first terminal needs to perform the time-frequency synchronization to ensure an interaction with the network device at a correct time and frequency location. In some embodiments, the first terminal can execute the time-frequency synchronization behavior corresponding to current paging occasion before current paging occasion. In some embodiments, the first terminal can also execute the time-frequency synchronization behavior corresponding to current paging occasion during current paging occasion.

In some embodiments, the first terminal uses SSB for the time-frequency synchronization. For example, when channel quality in the cell is good, the first terminal wakes up ahead of an SSB closest to the paging occasion and uses one SSB for time-frequency synchronization. When channel quality in the cell is poor, the first terminal wakes up ahead of multiple SSBs and uses multiple SSBs for time-frequency synchronization. In some embodiments of the present disclosure, when a reference signal of any optional antenna port is available, the first terminal can also use the reference signal for time-frequency synchronization without waking up ahead of multiple SSBs, thus reducing the power consumption of the terminal.

In some possible implementations, step 251 includes in the case of determining according to the notification information that the network device does not send reference signal corresponding to any antenna port, the first terminal determines to use SSB for time-frequency synchronization on the current or the next paging occasion.

The first terminal can determine whether there is still reference signal to be available according to the content of the notification information. For example, the first terminal obtains the reference signal configurations of two antenna ports from the RRC release message. The two antenna ports include antenna port 1 and antenna port 2. The notification information is used to notify that the network device stops sending of the reference signals corresponding to antenna port 1 and antenna port 2. The first terminal determines according to the notification information that the network device does not send reference signal corresponding to any antenna port.

Since the network device does not send reference signal corresponding to any antenna port, the first terminal cannot use the reference signal for time-frequency synchronization on the current or the next paging occasion, and the first terminal can only use SSB for time-frequency synchronization. It can be understood that the first terminal can also use other signals other than the reference signal and SSB for time-frequency synchronization, which is not limited in embodiments of the present disclosure.

In some other possible implementations, step 251 includes in the case of determining according to the notification information that the network device sends at least a reference signal corresponding to one antenna port, the first terminal determines to use SSB and the reference signal for time-frequency synchronization on the current or the next paging occasion.

The first terminal can determine whether there is still reference signal to be available according to the content of the notification information. For example, the first terminal obtains the reference signal configurations of two antenna ports from the RRC release message. The two antenna ports include antenna port 1 and antenna port 2. The content of the notification information is used to notify that the network device restarts sending of the reference signal corresponding to antenna port 2, and also to notify that the sending state of the reference signal corresponding to antenna port 1 is that the network device does not send the reference signal corresponding to antenna port 1. The first terminal can determine that the network device sends at least a reference signal corresponding to one antenna port.

Since the network device sends at least a reference signal corresponding to one antenna port, the first terminal can use the reference signal for time-frequency synchronization on the current or the next paging occasion. The first terminal uses the reference signal and SSB for time-frequency synchronization. It can be understood that the first terminal can also use other signals other than the reference signal and SSB for time-frequency synchronization, which is not limited in embodiments of the present disclosure.

Step 252, the first terminal determines according to the notification information and a channel quality in a cell of the first terminal the time-frequency synchronization behavior corresponding to the current or the next paging occasion.

After determining that the reference signal is available according to the notification information, the first terminal will also determine according to the channel quality in the cell thereof the time-frequency synchronization behavior corresponding to the current or the next paging occasion. The time-frequency synchronization behavior includes at least one of time synchronization behavior and frequency synchronization behavior.

In some possible implementations, step 252 includes in the case of determining according to the notification information that the network device does not send reference signal corresponding to any antenna port, the first terminal determines to use SSB for time-frequency synchronization on the current or the next paging occasion.

Since the network device does not send reference signal corresponding to any antenna port, the first terminal cannot use the reference signal for time-frequency synchronization on the current or the next paging occasion, and the first terminal can only use SSB for time-frequency synchronization. It can be understood that the first terminal can also use other signals other than the reference signal and SSB for time-frequency synchronization, which is not limited in embodiments of the present disclosure.

In some other possible implementations, step 252 includes in the case of determining according to the notification information that the network device sends at least a reference signal corresponding to one antenna port, and the channel quality in the cell is not lower than a threshold, the first terminal determines to use SSB for time-frequency synchronization on the current or the next paging occasion.

In some possible implementations, step 252 includes in the case of determining according to the notification information that the network device sends at least a reference signal corresponding to one antenna port, and the channel quality in the cell is lower than the threshold, the first terminal determines to use the SSB and the reference signal for time-frequency synchronization on the current or the next paging occasion.

Since the network device sends at least a reference signal corresponding to one antenna port, the first terminal can use the reference signal for time-frequency synchronization on the current or the next paging occasion. The first terminal will also determine the channel quality in the cell. When the channel quality in the cell is poor, the first terminal will use the reference signal and SSB for time-frequency synchronization. When the channel quality in the cell is good, the first terminal will still use SSB only for time-frequency synchronization. Since when the channel quality in the cell is good, the first terminal only needs to wake up ahead of one SSB and the power consumption of the first terminal is low, the first terminal can use SSB only for time-frequency synchronization. It can be understood that the first terminal can also use other signals other than the reference signal and SSB for time-frequency synchronization, which is not limited in embodiments of the present disclosure.

For example, if the channel quality in the cell is poor and the network device does not send reference signal corresponding to any antenna port, the first terminal uses three SSBs for time-frequency synchronization on the current or the next paging occasion.

For example, if the channel quality in the cell is poor and the network device sends at least a reference signal corresponding to one antenna port, the first terminal uses one SSB and the reference signal for time-frequency synchronization on the current or the next paging occasion.

According to the method provided by embodiments of the present disclosure, the first terminal in the idle or inactive state shares the reference signal of the second terminal in the connected state. The network device sends the notification information, which is used to notify at least one of the sending state change and the sending state of the reference signal corresponding to a target port, and the first terminal accordingly knows by receiving the notification information that whether the reference signal corresponding to the target port is sent, so that the accuracy of information interaction in the communication system can be improved.

According to the method provided by embodiments of the present disclosure, the first terminal can determine according to the notification information whether the network device sends a reference signal corresponding to at least one antenna port. In the case where the network device sends at least a reference signal corresponding to one antenna port, the first terminal can use the reference signal for time-frequency synchronization, so that it does not need to receive multiple SSBs, and performs the time-frequency synchronization only according to the SSBs to reduce the power consumption of the first terminal.

In some embodiments based on FIG. 2, the notification information can be indicated through different messages or signals. For example, embodiments of the present disclosure provides at least following four schemes for indicating the notification information.

In a first scheme, the network device sends paging DCI to the first terminal, and an indication bit in the paging DCI is used to indicate the sending state of the reference signal corresponding to a first target port.

Accordingly, the first terminal receives the paging DCI, and the indication bit in the paging DCI is used to indicate the sending state of the reference signal corresponding to the first target port.

The first target port includes all or part of the antenna ports in at least one antenna port corresponding to the reference signal configuration of the first terminal.

In some embodiments, the indication bit includes n bits, n is an integer not less than 1, and n bits and n first target ports are in one-to-one correspondence. For example, number of ports in at least one antenna port is 4. The first target port includes all antenna ports in the at least one antenna port, and thus number of the first target port is also 4. The indication bit includes 4 bits, and the 4 bits and the 4 first target ports are in one-to-one correspondence. For example, the number of ports in the at least one antenna port is 3. The first target port includes 2 ports of them, and thus the number of the first target port is 2. The indication bit includes 2 bits, and the 2 bits and the 2 first target ports are in one-to-one correspondence.

For example, the indication bit "1" indicates that the sending state of the reference signal of the first target port corresponding to the indication bit is that the network device sends the reference signal. The indication bit "0" indicates that the sending state of the reference signal of the first target port corresponding to the indication bit is that the network device does not send the reference signal. For example, the indication bit "0" indicates that the sending state of the reference signal of the first target port corresponding to the indication bit is that the network device sends the reference signal. The indication bit "1" indicates that the sending state of the reference signal of the first target port corresponding to the indication bit is that the network device does not send the reference signal.

In some embodiments, the indication bit is a reserved bit in paging DCI. The reserved bit is a bit that has not been defined with other information in paging DCI. In some embodiments, the indication bit is a newly added bit in paging DCI. The newly added bit is a bit newly added with respect to the bit in an existing paging DCI. In some embodiments, the indication bit is a custom bit in paging DCI. The custom bit is a redefined bit that has been defined before with other information in paging DCI.

For example, reference is made to Table 1 below, which shows a short message information field in paging DCI:

TABLE 1

Short message information field

| Bit | Short message information field |
|---|---|
| 1 | System information updates (System Info Modification) |
| 2 | Earthquake and tsunami warning system and commercial mobile alarm service indications (Etws And Cmas Indication) |
| 3-8 | Reserved bits |

As shown in Table 1, the short message information field corresponds to 8 bits. Among which, bit 1 is a system information update bit. When bit 1 is set to 1, it is used to indicate the modification of the Broadcast Control Channel (BCCH) in addition to System Information Blocks (SIB) 6, 7 and 8. Bit 2 is a system information update bit. When bit 2 is set to 1, it is used to indicate a main notification of an earthquake and tsunami warning system, and/or a secondary notification of the earthquake and tsunami warning system, and/or a commercial mobile alarm service notification. Bits 3-8 are reserved bits. In the case where the paging DCI carries the short message information field therein, the indication bit can be one or more bits in bits 3-8 (i.e., reserved bits), or one or more bits in bits 1-2 (i.e., custom bits).

In some embodiments, in the case where the sending state of the reference signal corresponding to the first target port is indicated by the indication bit in paging DCI, the first terminal will also receive the paging message corresponding to the paging DCI, and the paging message carries with UE identification. The UE identification is the identification information corresponding to a terminal being paged. For example, if the UE identification carried in the paging message includes the UE identification of the first terminal, the first terminal will initiate an RRC connection. If the UE identification carried in the paging message does not include the UE identification of the first terminal, the first terminal will continue to sleep.

In some embodiments, in the case where the sending state of the reference signal corresponding to the first target port is indicated by the indication bit in paging DCI, the first terminal will determine according to the notification information the time-frequency synchronization behavior corresponding to the current or next paging occasion.

For example, the first terminal determines according to the indication bit in the paging DCI that the network device sends at least a reference signal corresponding to one antenna port. The time when the first terminal receives the paging DCI is recorded as T0, and the time when the first terminal receives the paging message corresponding to the paging DCI is recorded as T1. If there is available reference signal between T0 and T1, the first terminal uses SSB and the reference signal for time-frequency synchronization for the current paging occasion.

For example, the first terminal determines according to the indication bit in the paging DCI that the network device sends at least a reference signal corresponding to one antenna port. The time when the first terminal receives the paging DCI is recorded as T0, and the time when the first terminal receives the paging message corresponding to the paging DCI is recorded as T1. If there is no available reference signal between T0 and T1, the first terminal uses SSB and the reference signal for time-frequency synchronization for the next paging occasion.

In a second scheme, the network device sends a first paging message carrying with the indication information to the first terminal, or sends a second paging message not carrying with the indication information to the first terminal. The first paging message is used to indicate a first sending state of the reference signal corresponding to a second target port, and the second paging message is used to indicate a second sending state of the reference signal corresponding to the second target port.

Correspondingly, the first terminal receives the first paging message carrying with the indication information, or receives the second paging message not carrying with the indication information. The first paging message is used to indicate the first sending state of the reference signal corresponding to the second target port, and the second paging message is used to indicate the second sending state of the reference signal corresponding to the second target port.

The second target port is one of the at least one antenna port corresponding to the reference signal configuration of the first terminal. The indication information is the information originally used in the paging message to indicate the content irrelevant to the sending state of the reference signal. In some embodiments, the indication information includes UE identification. The UE identification is the identification information corresponding to a terminal being paged.

For example, the first sending state refers to a state that the network device sends the reference signal corresponding to the second target port, and the second sending state refers to a state that the network device does not send the reference signal corresponding to the second target port. For example, the first sending state refers to a state that the network device does not send the reference signal corresponding to the second target port, and the second sending state refers to a state that the network device sends the reference signal corresponding to the second target port.

In some embodiments, when the network device sends the first paging message or the second paging message to the first terminal to indicate the sending state of the reference signal corresponding to the second target port, the first terminal will determine according to the notification information the time-frequency synchronization behavior corresponding to the next paging occasion.

In a third scheme, the network device sends a third paging message not carrying with the indication information to the first terminal. The third paging message is used to indicate the sending state change of the reference signal corresponding to the third target port.

Accordingly, the first terminal receives the third paging message not carrying with the indication information, and the third paging message is used to indicate the sending state change of the reference signal corresponding to the third target port.

The third target port is one of the at least one antenna port corresponding to the reference signal configuration of the first terminal. The indication information is the information originally used in the paging message to indicate the content irrelevant to the sending state of the reference signal. In some embodiments, the indication information includes UE identification. The UE identification is the identification information corresponding to a terminal being paged.

In some embodiments, if the paging message carries with the indication information, it indicates that the sending of the reference signal corresponding to the third target port by the network device has not changed. If the paging message does not carry with the indication information, it indicates that the sending of the reference signal corresponding to the third target port by the network device has changed, for example, the network device stops the sending of the reference signal corresponding to the third target port, or the network device restarts the sending of the reference signal corresponding to the third target port.

In some embodiments, when the sending state change of the reference signal corresponding to the third target port is indicated by the third paging message not carrying with the indication information, the first terminal will determine according to the notification information the time-frequency synchronization behavior corresponding to the next paging occasion.

In a fourth scheme, the network device sends a supplementary reference signal to the first terminal. The information in the supplementary reference signal is used to indicate the sending state of the reference signal corresponding to a fourth target port. The supplementary reference signal is a signal different from the reference signal.

Accordingly, the first terminal receives the supplementary reference signal, and the information in the supplementary reference signal is used to indicate the sending state of the reference signal corresponding to the fourth target port. The supplementary reference signal is a signal different from the reference signal.

The fourth target port is one of the at least one antenna port corresponding to the reference signal configuration of the first terminal.

In some embodiments, the information in the supplementary reference signal includes, but is not limited to, codeword characteristic of the supplementary reference signal. For example, when the codeword characteristic of the supplementary reference signal is a first characteristic, it indicates that the sending state of the reference signal corresponding to the fourth target port is that the network device sends the reference signal corresponding to the fourth target port. When the codeword characteristic of the supplementary reference signal is a second characteristic, it indicates that the sending state of the reference signal corresponding to the fourth target port is that the network device does not send the reference signal corresponding to the fourth target port.

In some embodiments, when the sending state of the reference signal corresponding to the fourth target port is indicated by the information in the supplementary reference signal, the first terminal will determine according to the notification information the time-frequency synchronization behavior corresponding to the next paging occasion.

It should be understood that above four schemes can be implemented separately, or two or three or all of the four schemes in combination. The exemplary description of the combined implementation will be given in the following.

For example, the target port includes three antenna ports. The sending states of the reference signal corresponding to two of the antenna ports are indicated by the indication bit in the paging DCI, and the sending state change of the reference signal corresponding to the other antenna port is indicated by the third paging message no carrying with the indication information.

For example, the target port includes four antenna ports. The sending state of the reference signal corresponding to the first antenna port is indicated by the indication bit in the paging DCI, the sending state of the reference signal corresponding to the second antenna port is indicated by whether the paging message carries with the indication information, the sending state change of the reference signal corresponding to the third antenna port is indicated by the third paging message not carrying with the indication information, and the sending state of the reference signal corresponding to the fourth antenna port is indicated by the information in the supplementary reference signal.

According to the method provided by embodiments of the present disclosure, the first terminal in the idle or inactive state shares the reference signal of the second terminal in the connected state. The network device sends the notification information, which is used to notify at least one of the sending state change and the sending state of the reference signal corresponding to a target port, and the first terminal accordingly knows by receiving the notification information that whether the reference signal corresponding to the target port is sent, so that the accuracy of information interaction in the communication system can be improved.

According to the method provided by embodiments of the present disclosure, the sending state change or the sending state of the reference signal corresponding to the target port can be indicated through one of the paging DCI, the paging message and the supplementary reference signal, which improves the flexibility of the implementation of the notification information.

In some embodiments based on FIG. 2, the reference signal includes but is not limited to at least one of CSI-RS and TRS.

It should be noted that above method embodiments can be implemented separately or in combination, which is not limited in the present disclosure.

In above embodiments, the steps executed by the first terminal can be independently implemented as a message receiving method on the first terminal side, and the steps executed by the network device can be independently implemented as a message notification method on the network device side.

Figure 5:
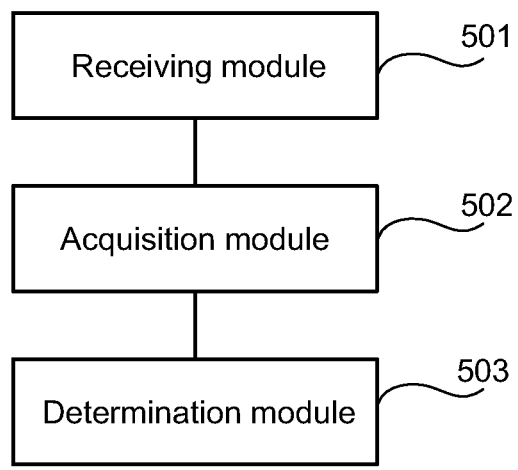
FIG. 5 is a block diagram of an information receiving apparatus provided by exemplary embodiments of the present disclosure.

FIG. 5 is a block diagram of an information receiving apparatus provided by exemplary embodiments of the present disclosure. The apparatus is applied to the first terminal in the idle or inactive state. The first terminal shares the reference signal of the second terminal. The second terminal is at least one terminal in the connected state. The apparatus includes a receiving module 501.

The receiving module 501 is configured to receive notification information, which is used to notify at least one of a sending state change and a sending state of a reference signal corresponding to a target port.

In some embodiments, the apparatus further includes an acquisition module 502. The acquisition module 502 is configured to obtain reference signal configuration of at least one antenna port from an RRC release message. The target port is an antenna port in the at least one antenna port.

In some embodiments, the reference signal configuration of at least one antenna port includes the reference signal configuration of one antenna port, or reference signal configurations of multiple antenna ports.

In some embodiments, the sending state change of the reference signal corresponding to the target port includes stopping sending of the reference signal corresponding to at least one antenna port in the target port.

In some embodiments, the sending state change of the reference signal corresponding to the target port includes restarting sending of the reference signal corresponding to at least one antenna port in the target port.

In some embodiments, the apparatus further includes a determination module 503. The determination module 503 is configured to determine, according to the notification information, the time-frequency synchronization behavior corresponding to the current or the next paging occasion, or the determination module 503 is configured to determine, according to the notification information and the channel quality in the cell of the first terminal, the time-frequency synchronization behavior corresponding to the current or the next paging occasion.

In some embodiments, the determination module 503 is configured to determine to use SSB for the time-frequency synchronization on the current or the next paging occasion in the case of determining according to the notification information that a network device does not send reference signal corresponding to any antenna port. The determination module 503 is configured to determine to use of the SSB and the reference signal for the time-frequency synchronization on the current or the next paging occasion in the case of determining according to the notification information that the network device sends at least a reference signal corresponding to one antenna port. The time-frequency synchronization includes at least one of time synchronization and frequency synchronization.

In some embodiments, the determination module 503 is configured to determine to use SSB for the time-frequency synchronization on the current or the next paging occasion in the case of determining according to the notification information that the network device does not send reference signal corresponding to any antenna port. The determination module 503 is configured to determine to use SSB for the time-frequency synchronization on the current or the next paging occasion in the case of determining according to the notification information that the network device sends at least a reference signal corresponding to one antenna port and the channel quality in the cell is not lower than a threshold. The determination module 503 is configured to determine to use SSB and the reference signal for the time-frequency synchronization on the current or the next paging occasion in the case of determining according to the notification information that the network device sends at least a reference signal corresponding to one antenna port and the channel quality in the cell is lower than the threshold. The time-frequency synchronization includes at least one of time synchronization and frequency synchronization.

In some embodiments, the receiving module 501 is configured to receive the paging DCI, and an indication bit in the paging DCI is used to indicate the sending state of the reference signal corresponding to a first target port.

In some embodiments, the receiving module 502 is configured to receive a paging message corresponding to the paging DCI. The paging message carries with UE identification.

In some embodiments, the indication bit includes n bits, n is an integer not less than 1, and n bits and n first target ports are in one-to-one correspondence.

In some embodiments, the indication bit is a reserved bit in the paging DCI, or the indication bit is a custom bit in the paging DCI.

In some embodiments, the receiving module 501 is configured to receive a first paging message carrying with indication information, or the receiving module 501 is configured to receive a second paging message not carrying with the indication information. The first paging message is used to indicate a first sending state of the reference signal corresponding to a second target port, and the second paging message is used to indicate a second sending state of the reference signal corresponding to the second target port.

In some embodiments, the receiving module 501 is configured to receive a third paging message not carrying with indication information, and the third paging message is used to indicate the sending state change of the reference signal corresponding to a third target port.

In some embodiments, the indication information includes UE identification.

In some embodiments, the receiving module 501 is configured to receive a supplementary reference signal. The information in the supplementary reference signal is used to indicate the sending state of the reference signal corresponding to a fourth target port. The supplementary reference signal is a signal different from the reference signal.

In some embodiments, the reference signal includes at least one of CSI-RS and TRS.

Figure 6:
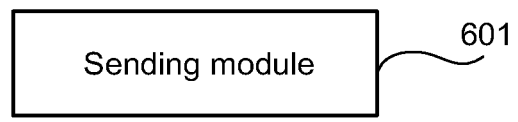
FIG. 6 is a block diagram of an information notification apparatus provided by exemplary embodiments of the present disclosure.

FIG. 6 is a block diagram of an information notification apparatus provided by exemplary embodiments of the present disclosure. The apparatus includes a sending module 601.

The sending module 601 is configured to send notification information to a first terminal, and the notification information is used to notify at least one of a sending state change and a sending state of a reference signal corresponding to a target port.

Herein, the first terminal is in an idle or an inactive state, the first terminal shares the reference signal of a second terminal, and the second terminal is at least one terminal in a connected state.

In some embodiments, the sending module 601 is configured to send an RRC release message to the first terminal. The RRC release message includes the reference signal configuration of at least one antenna port, and the target port is an antenna port in the at least one antenna port.

In some embodiments, the reference signal configuration of at least one antenna port includes the reference signal configuration of one antenna port, or the reference signal configuration of multiple antenna ports.

In some embodiments, the sending state change of the reference signal corresponding to the target port includes stopping sending of the reference signal corresponding to at least one antenna port in the target port.

In some embodiments, the sending state change of the reference signal corresponding to the target port includes restarting sending of the reference signal corresponding to at least one antenna port in the target port.

In some embodiments, the sending module 601 is configured to send paging Downlink Control Information (paging DCI) to the first terminal, and an indication bit in the paging DCI is used to indicate the sending state of the reference signal corresponding to a first target port.

In some embodiments, the sending module 601 is configured to send a paging message corresponding to the paging DCI. The paging message carries with UE identification.

In some embodiments, the indication bit includes n bits, n is an integer not less than 1, and n bits and n first target ports are in one-to-one correspondence.

In some embodiments, the indication bit is a reserved bit in the paging DCI, or the indication bit is a custom bit in the paging DCI.

In some embodiments, the sending module 601 is configured to send a first paging message carrying with indication information to the first terminal, or the sending module 601 is configured to send a second paging message not carrying with indication information to the first terminal. The first paging message is used to indicate a first sending state of the reference signal corresponding to a second target port, and the second paging message is used to indicate a second sending state of the reference signal corresponding to the second target port.

In some embodiments, the sending module 601 is configured to send a third paging message not carrying with indication information to the first terminal, and the third paging message is used to indicate the sending state change of the reference signal corresponding to a third target port.

In some embodiments, the indication information includes UE identification.

In some embodiments, the sending module 601 is configured to send a supplementary reference signal to the first terminal. The information in the supplementary reference signal is used to indicate the sending state of the reference signal corresponding to a fourth target port. The supplementary reference signal is a signal different from the reference signal.

In some embodiments, the reference signal includes at least one of CSI-RS and TRS.

Figure 7:
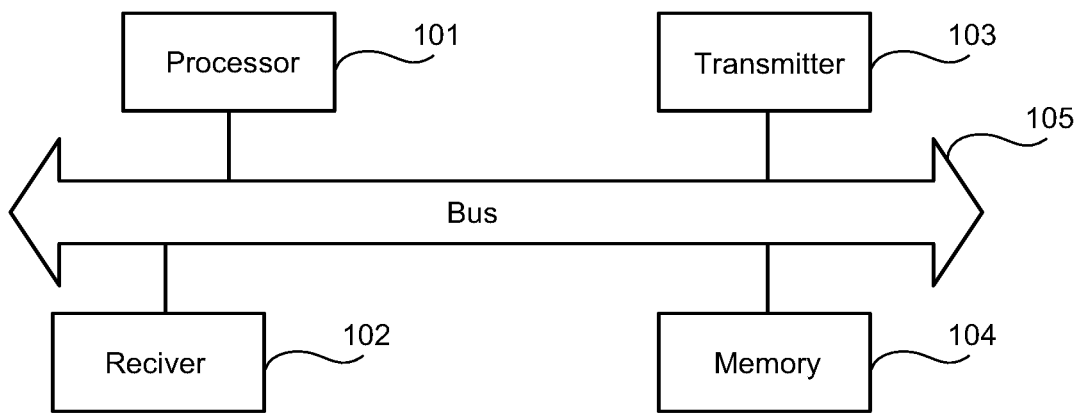
FIG. 7 is a block diagram of a communication device provided by exemplary embodiments of the present disclosure.

FIG. 7 is a structural schematic showing a communication device (a first terminal or a network device) provided by exemplary embodiments of the present disclosure. The terminal includes a processor 101, a receiver 102, a transmitter 103, a memory 104 and a bus 105.

The processor 101 includes one or more processing cores. The processor 101 executes various functional applications and information processing by running software programs and modules.

The receiver 102 and the transmitter 103 can be implemented as a communication component, which can be a communication chip.

The memory 104 is connected with the processor 101 through the bus 105.

The memory 104 can be configured to store at least one instruction, and the processor 101 can be configured to execute the at least one instruction to realize steps in above method embodiments.

In addition, the memory 104 can be realized by any type of volatile or non-volatile storage or combination thereof. The volatile or non-volatile storage includes but is not limited to disk or optical disk, electrically-erasable programmable read-only memory (EEPROM), erasable programmable read-only memory (EPROM), static random access memory (SRAM), read-only memory (ROM), magnetic memory, flash memory, programmable read-only memory (PROM).

In some embodiments, a computer-readable storage medium is also provided, in which at least one instruction, at least one program, code sets or instruction sets are stored. The at least one instruction, at least one program, code sets or instruction sets are loaded and executed by a processor to realize the information receiving method or information notification method executed by a communication device provided by above method embodiments.

It could be understood for those skilled in the art that all or part of the steps in above embodiments can be realized by hardware, or by programs to instruct related hardware to complete. The programs can be stored in a computer-readable storage medium. The storage medium mentioned above can be read-only memory, disk or optical disk, etc.

Above embodiments are only embodiments of the present disclosure, which are not intended to limit the present disclosure. Any modifications, equivalent replacements, improvements, etc. made within the spirit and principles of the present disclosure shall be included in the protection scope of the present disclosure.

What is claimed is:
1. An information notification method, comprising:
sending, by a network device, notification information to a first terminal, wherein the notification information is configured for the first terminal in an idle or an inactive state to determine at least one of a sending state change or a sending state of a reference signal corresponding to a target port, wherein the reference signal corresponding to the target port is shared by the first terminal and at least one second terminal in a connected state; wherein the sending state change denotes a transition of the network device's sending state for the reference signal from a previous state to a next state, and the sending state comprises sending or not sending the reference signal corresponding to the target port by the network device; and wherein the notification information comprises paging Downlink Control Information (paging DCI) that comprises an indication field configured to indicate the sending state of the reference signal corresponding to a first target port out of the target port, the indication field comprises n bits, wherein n is an integer not less than 1, and the n bits and n first target ports are in one-to-one correspondence.

2. The method according to claim 1, further comprising: sending, by the network device, a Radio Resource Control (RRC) release message to the first terminal before sending the notification information to the first terminal, wherein the RRC release message is configured for the first terminal in the connected state to enter the idle or the inactive state, the RRC release message comprises reference signal configuration of at least one antenna port, and the target port is an antenna port in the at least one antenna port.

3. The method according to claim 2, wherein the reference signal configuration of the at least one antenna port comprises:
the reference signal configuration of one antenna port; or
the reference signal configuration of multiple antenna ports.

4. The method according to claim 1, wherein the sending state change of the reference signal corresponding to the target port comprises:
stopping sending of the reference signal corresponding to at least one antenna port in the target port.

5. The method according to claim 1, wherein the sending state change of the reference signal corresponding to the target port comprises:
restarting sending of the reference signal corresponding to at least one antenna port in the target port.

6. The method according to claim 1, further comprising: sending, by the network device, a paging message corresponding to the paging DCI, wherein the paging message carries with UE identification.

7. The method according to claim 1, wherein sending the notification information to the first terminal comprises:
sending a first paging message comprising indication information to the first terminal; or
sending a second paging message not comprising the indication information to the first terminal;
wherein the first paging message is configured to indicate a first sending state of the reference signal corresponding to a second target port out of the target port based on that the first paging message comprises the indication information, and the second paging message is configured to indicate a second sending state of the reference signal corresponding to the second target port out of the target port based on that the second paging message does not comprise the indication information.

8. The method according to claim 7, wherein the indication information comprises UE identification.

9. The method according to claim 1, wherein sending the notification information to the first terminal comprises:
sending a third paging message not comprising indication information to the first terminal, wherein the third paging message is configured to indicate the sending state change of the reference signal corresponding to a third target port out of the target port based on that the third paging message does not comprise the indication information.

10. The method according to claim 1, wherein sending the notification information to the first terminal comprises:
sending a supplementary reference signal to the first terminal, wherein information in the supplementary reference signal is configured to indicate the sending state of the reference signal corresponding to a fourth target port out of the target port, and the supplementary reference signal is a signal different from the reference signal.

11. The method according to claim 1, wherein the reference signal comprises at least one of Channel State Information Reference Signal (CSI-RS) or Tracking Reference Signal (TRS).

12. A non-transitory computer-readable storage medium having executable instructions stored thereon, which when executed by a processor, cause the information notification method according to claim 1 to be implemented.

13. An information receiving method, comprising:
receiving, by a first terminal in an idle or an inactive state, notification information, wherein the notification information is configured for the first terminal to determine at least one of a sending state change and a sending state of a reference signal corresponding to a target port, wherein the reference signal corresponding to the target port is shared by the first terminal and at least one second terminal in a connected state; wherein the sending state change denotes a transition of the network device's sending state for the reference signal from a previous state to a next state, and the sending state comprises sending or not sending the reference signal corresponding to the target port by the network device; and wherein the notification information comprises paging Downlink Control Information (paging DCI) that comprises an indication field configured to indicate the sending state of the reference signal corresponding to a first target port out of the target port, the indication field comprises n bits, wherein n is an integer not less than 1, and the n bits and n first target ports are in one-to-one correspondence.

14. The method according to claim 13, further comprising:
obtaining, by the first terminal, reference signal configuration of at least one antenna port from a Radio Resource Control (RRC) release message, wherein the RRC release message is received before the notification information is received, and is configured for the first terminal in the connected state to enter the idle or the inactive state, and the target port is an antenna port in the at least one antenna port.

15. The method according to claim 14, further comprising:
determining, by the first terminal and according to the notification information, time-frequency synchronization behavior corresponding to a current or a next paging occasion; or
determining, by the first terminal and according to the notification information and channel quality in a cell of the first terminal, the time-frequency synchronization behavior corresponding to the current or the next paging occasion.

16. The method according to claim 15, wherein determining, according to the notification information, the time-frequency synchronization behavior corresponding to the current or the next paging occasion comprises:
   in response to determining, according to the notification information, that a network device does not send reference signal corresponding to any antenna port, using Synchronization Signal Block (SSB) for time-frequency synchronization on the current or the next paging occasion; and
   in response to determining, according to the notification information, that the network device sends at least a reference signal corresponding to one antenna port, using the SSB and the reference signal for the time-frequency synchronization on the current or the next paging occasion;
   wherein the time-frequency synchronization comprises at least one of time synchronization or frequency synchronization.

17. The method according to claim 15, wherein determining, according to the notification information and the channel quality in the cell of the first terminal, the time-frequency synchronization behavior corresponding to the current or the next paging occasion comprises:
   in response to determining, according to the notification information, that the network device does not send reference signal corresponding to any antenna port, using Synchronization Signal Block (SSB) for the time-frequency synchronization on the current or the next paging occasion;
   in response to determining, according to the notification information, that the network device sends at least a reference signal corresponding to one antenna port and the channel quality in the cell is not lower than a threshold, using the SSB for the time-frequency synchronization on the current or the next paging occasion; and
   in response to determining, according to the notification information, that the network device sends at least a reference signal corresponding to one antenna port and the channel quality in the cell is lower than the threshold, using the SSB and the reference signal for the time-frequency synchronization on the current or the next paging occasion;
   wherein the time-frequency synchronization comprises at least one of time synchronization or frequency synchronization.

18. A first terminal, comprising:
   a processor;
   a transceiver connected with the processor; and
   a memory for storing instructions executable by the processor;
   wherein the processor is configured to execute the instructions to implement the information receiving method according to claim 13.

19. A non-transitory computer-readable storage medium having executable instructions stored thereon, which when executed by a processor, cause the information receiving method according to claim 13 to be implemented.

20. A network device, comprising:
   a processor;
   a transceiver connected with the processor; and
   a memory for storing instructions executable by the processor;
   wherein the processor is configured to:
   send notification information to a first terminal, wherein the notification information is configured for the first terminal in an idle or an inactive state to determine at least one of a sending state change or a sending state of a reference signal corresponding to a target port, wherein the reference signal corresponding to the target port is shared by the first terminal and at least one second terminal in a connected state; wherein the sending state change denotes a transition of the network device's sending state for the reference signal from a previous state to a next state, and the sending state comprises sending or not sending the reference signal corresponding to the target port by the network device; and
   wherein the notification information comprises paging Downlink Control Information (paging DCI) that comprises an indication field configured to indicate the sending state of the reference signal corresponding to a first target port out of the target port, the indication field comprises n bits, wherein n is an integer not less than 1, and the n bits and n first target ports are in one-to-one correspondence.

* * * * *